(12) United States Patent
Han et al.

(10) Patent No.: US 11,240,822 B2
(45) Date of Patent: Feb. 1, 2022

(54) METHOD AND DEVICE FOR PROCESSING NETWORK ALLOCATION VECTOR

(71) Applicant: ZTE CORPORATION, Guangdong (CN)

(72) Inventors: Zhiqiang Han, Guangdong (CN); Weimin Xing, Guangdong (CN); Kaiying Lv, Guangdong (CN); Nan Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/083,375

(22) PCT Filed: Sep. 1, 2016

(86) PCT No.: PCT/CN2016/097785
§ 371 (c)(1),
(2) Date: Sep. 7, 2018

(87) PCT Pub. No.: WO2017/152599
PCT Pub. Date: Sep. 14, 2017

(65) Prior Publication Data
US 2019/0090249 A1    Mar. 21, 2019

(30) Foreign Application Priority Data

Mar. 8, 2016   (CN) .......................... 201610130504.4

(51) Int. Cl.
*H04W 72/08* (2009.01)
*H04W 72/04* (2009.01)
(Continued)

(52) U.S. Cl.
CPC ..... *H04W 72/082* (2013.01); *H04W 72/0446* (2013.01); *H04W 74/0816* (2013.01); *H04W 74/085* (2013.01); *H04W 84/12* (2013.01)

(58) Field of Classification Search
CPC ........... H04W 72/082; H04W 74/0816; H04W 72/0446; H04W 84/12; H04W 74/085
See application file for complete search history.

(56) References Cited

U.S. PATENT DOCUMENTS

2007/0147284 A1* 6/2007 Sammour ............. H04W 74/04
370/328
2008/0002615 A1* 1/2008 Nakajima ............. H04L 1/1854
370/328

(Continued)

FOREIGN PATENT DOCUMENTS

| CN | 1996908 A | 7/2007 |
| CN | 103037531 A | 4/2013 |

(Continued)

OTHER PUBLICATIONS

Barriac et al., "Backoff Mechanisms Techniques for Spatial Reuse", U.S. Appl. No. 62/207,790, filed Aug. 20, 2015 (Year: 2015).*

(Continued)

*Primary Examiner* — Thinh D Tran
(74) *Attorney, Agent, or Firm* — Perkins Coie LLP

(57) ABSTRACT

A method for processing a network allocation vector (NAV) includes: terminating the receiving of a first radio frame when it is determined that a target receiving station of the first radio frame being received is not a first station; and updating an NAV of the first station or maintaining the NAV of the first station unchanged according to a remaining duration of the first radio frame and a first transmission opportunity duration carried in the first radio frame, where the remaining duration of the first radio frame is the transmission time used for transmitting the remaining part of the first radio frame after the receiving of the first radio frame is terminated. The technical solution solves the problem in the related art of collisions with hidden stations caused by an inaccurate NAV update in the existing art, thereby ensuring (Continued)

the accuracy of an NAV update and the fairness of transmission and channel contention, and reducing collisions among hidden stations.

24 Claims, 5 Drawing Sheets

(51) Int. Cl.
*H04W 74/08* (2009.01)
*H04W 84/12* (2009.01)

(56) References Cited

U.S. PATENT DOCUMENTS

| | | | |
|---|---|---|---|
| 2011/0064013 A1* | 3/2011 | Liu | H04W 74/0816 370/312 |
| 2014/0185557 A1* | 7/2014 | Yang | H04W 74/0816 370/329 |
| 2015/0117343 A1 | 4/2015 | Xing et al. | |
| 2015/0312940 A1 | 10/2015 | Xing et al. | |
| 2016/0140172 A1 | 5/2016 | Bornea et al. | |
| 2016/0174262 A1 | 6/2016 | Xing et al. | |
| 2017/0055160 A1* | 2/2017 | Barriac | H04W 16/14 |
| 2017/0295560 A1* | 10/2017 | Kim | H04L 5/0055 |

FOREIGN PATENT DOCUMENTS

| | | |
|---|---|---|
| CN | 103378929 A | 10/2013 |
| EP | 2846573 A1 | 3/2015 |
| EP | 3007510 A1 | 4/2016 |
| WO | 2014173307 A1 | 10/2014 |

OTHER PUBLICATIONS

Kim et al., "TXOP Duration Format and TXOP Truncation in 802.11AX System", U.S. Appl. No. 62/163,984, filed May 20, 2015 (Year: 2015).*

Kim et al., "Methods of Managing Two Navs", U.S. Appl. No. 62/276,244, filed Jan. 8, 2016 (Year: 2016).*

International Search Report dated Nov. 28, 2016 for International Application No. PCT/CN2016/097785, 5 pages.

Written Opinion of the International Searching Authority dated Nov. 28, 2016 for International Application No. PCT/CN2016/097785, 3 pages.

Extended European Search Report dated Sep. 11, 2019 for International Application No. PCT/CN2016/097785, 7 pages.

* cited by examiner

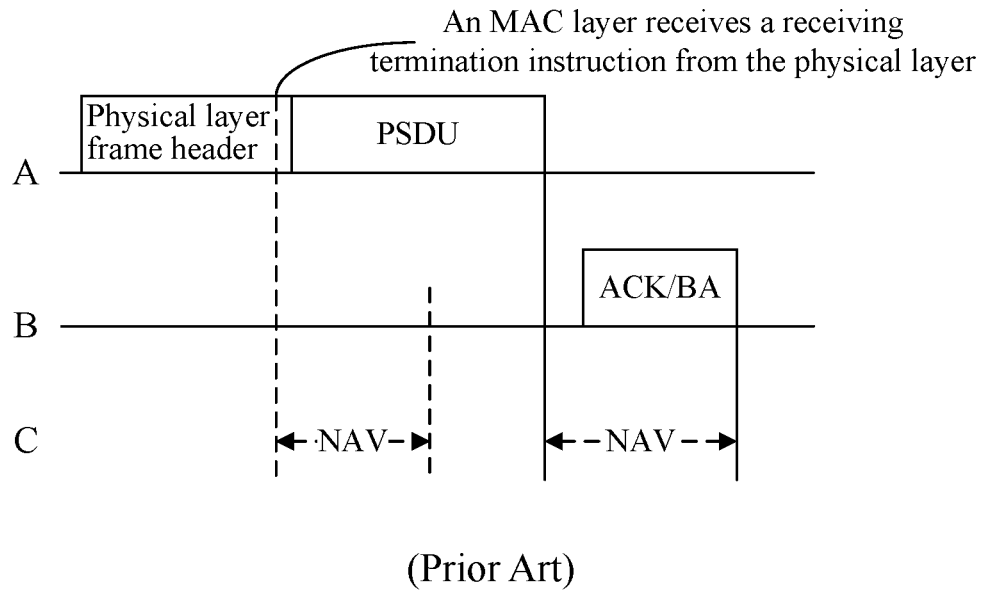

(Prior Art)

Figure 3

| Terminate the receiving of a first radio frame when it is determined that a destination receiving station of the first radio frame being received is not a first station | S402 |

| Update an NAV of the first station or maintain the NAV of the first station unchanged according to a remaining duration of the first radio frame and a first transmission opportunity duration carried in the first radio frame, where the remaining duration of the first radio frame is a transmission time used for transmitting the remaining part of the first radio frame after the receiving of the first radio frame is terminated | S404 |

Figure 4

METHOD AND DEVICE FOR PROCESSING NETWORK ALLOCATION VECTOR

CROSS REFERENCE TO RELATED APPLICATIONS

This is the U.S. National Phase Application, filed under 35 U.S.C. § 371, of International Patent Application No. PCT/CN2016/097785, filed on Sep. 1, 2016, which claims priority to Chinese patent application No. 201610130504.4 filed on Mar. 8, 2016, the entire disclosure of each of which is hereby incorporated by reference.

TECHNICAL FIELD

The present application relates to, but is not limited to, the field of communications, and, in particular, to a method and device for processing a network allocation vector (NAV).

BACKGROUND

At present, in the field of wireless networks, a Wireless Local Area Network (WLAN) is rapidly developing. For example, the 802.11ac technology brings a data rate of more than 1 Gbps by introducing a larger channel bandwidth, a higher-order multiple input multiple output (MIMO) technology, and other technologies. However, as the network density and the number of users increase, the efficiency of the WLAN tends to decrease significantly. The problem of network efficiency cannot be solved by simply increasing a transmission rate. Therefore, the Institute for Electrical and Electronic Engineers (IEEE) standards association has established a TGax task group focusing on addressing the problem of the efficiency of the WLAN. The TGax is also called a High Efficiency (HE) task group.

In 802.11 standards, an access point (AP) and multiple stations (STAs) associated with the AP constitute a basic service set (BSS). In 802.11 standards, two operation modes: distributed coordination function (DCF) and point coordination function (PCF), and the improvements of the two operation modes: enhanced distributed channel access (EDCA) and hybrid coordination function controlled channel access (HCCA) are defined. The DCF is the most basic operation mode, and a Carrier Sense Multiple Access with Collision Avoidance (CSMA/CA) mechanism enables multiple stations to share a wireless channel. The EDCA is an enhanced operation mode and the EDCA maps upper-level data to four different queue access categories (ACs): AC_VO (voice), AC_VI (video), AC_BE (best effort), and AC_BK (background). Each queue access category uses different parameters of channel contention to rank their priorities. The EDCA uses the CSMA/CA mechanism to allow multiple queues with different priorities to share the wireless channel and to reserve a Transmission Opportunity (TXOP).

When multiple wireless stations share a channel, it is very difficult to detect collisions in the wireless environment, and one major problem is hidden stations. As shown in FIG. 1, a station A sends data to a station B, and meanwhile a station C also sends data to the station B. Since the station C and the station A are outside the coverage of each other, the simultaneous data transmissions of the station A and the station C to the station B will cause a collision. From the perspective of the station A, the station C is a hidden station. To solve the problem of hidden stations, in the 802.11 standards, a virtual channel detection mechanism is proposed, that is, a reserved channel time information (Duration field) is included in a Media Access Control (MAC) frame header of a radio frame to avoid the collision with hidden stations. The reserved channel time information included in the Media Access Control (MAC) frame header protects a period of time after the end of the radio frame. Other auditor stations that receive the radio frame including the reserved channel time information set a network allocation vector (NAV) stored locally. The value of the NAV is set to be the maximum one of the reserved channel time information and the retained time information. In this period of time, other auditor stations will not send data, thereby avoiding the channel contention of the hidden stations and collisions with hidden stations. Only after the NAV decreases to zero, can other stations send data. For example, the sender sends a Request To Send (RTS) frame for channel reservation and the RTS includes a channel reservation time information; the receiver (i.e., a destination station for receiving the radio frame) responds with a Clear To Send (CTS) frame to confirm the channel reservation and the CTS also includes a channel reservation time information to ensure that the sender can complete subsequent exchanges of data frames. How to set the NAV is illustrated in FIG. 2. The general exchange process of data frames includes that the sender sends a data frame and the target receiver replies with a response frame after the data frame is successfully received. The NAV reserved by the RTS/CTS in FIG. 2 may include the time for multiple frame exchanges. In FIG. 2, SIFS is short for Short Inter frame Space. In addition, the data frame and the response frame may also include the channel reservation time information. For example, the data frame may be directly transmitted without using the channel duration reserved by the RTS/CTS. The data frame and response frame thereof carry the channel reservation duration. The reserved duration field in the data frame includes at least the transmission time of the response frame in the present frame exchange and may further include the time for a subsequent frame exchange.

In a WLAN system, a radio frame generally includes a physical layer header, preamble, and a PHY service data unit (PSDU) of a physical layer payload. In the published WLAN technology standards, the preamble includes a training sequence and a signaling instruction required to decode the PSDU, such as a rate and a coding mode. In the IEEE 802.11ax, four preamble types are defined according to different application scenarios: High Efficiency Single-User (HE SU) format, High Efficiency Multiple-User (HE MU) format, High Efficiency Trigger based Uplink (UL) format, and High Efficiency Extended Range SU format. Among the above preamble types, a High Efficiency SIGNAL field A (HE-SIG-A) and a High Efficiency SIGNAL field B (HE-SIG-B) are used for carrying high efficiency (HE) user information, where the HE SIG is short for High Efficiency SIGNAL field. The HE-SIG-A exists in all the above four preamble types; while the HE-SIG-B is used for indicating the information of each user in the case of multiple users and is carried in the Multiple-User format. The positions of each field in the above four preamble types are determined, and their lengths may be determined according to instructions of other fields. For example, in the Multiple-User format, the symbol number of the HE-SIG-B will be indicated by the HE-SIG-A. The difference between the Extended Range Single-User format and the Single-User format is whether the HE-SIG-A is repeated. That is, the Extended Range Single-User format includes two HE-SIG-As.

The identification information of the receiver is added to the physical layer frame header. When an STA detects a radio frame and the physical layer frame header of the radio frame indicates that the STA is not the receiver of the frame, the STA may give up receiving the Physical layer payload of the radio frame. The main purpose is to prevent the STA from decoding unrelated data packets and save station power. The identification information of the receiver includes a basic service set identifier and a transmission opportunity duration (TXOP Duration) instruction (equivalent to the reserved channel duration field included in the MAC layer and having different name in different layers) and spatial multiplexing information. In the case where multiple users exist in the downlink, the identification information of the receiver further includes identification information of each receiver and the like.

A third-party station determines whether to terminate the receiving in advance according to the identification information of the receiver in the physical layer preamble. In the related art, when the receiving of the radio frame is terminated in advance, the third-party station updates the NAV only by using the TXOP Duration, thereby causing advanced protection, an inaccurate NAV update, and collisions with hidden stations.

No effective solution has been provided to solve the problem of collisions with hidden stations caused by the inaccurate NAV update in the related art.

SUMMARY

The following is a summary of the subject matter described in detail in the present disclosure. This summary is not intended to limit the scope of the claims.

Embodiments of the present disclosure provide a method and device for processing a network allocation vector (NAV) to solve at least the problem of collisions with hidden stations caused by an inaccurate NAV update in the related art.

According to one aspect of the embodiments of the present disclosure, a method for processing a network allocation vector (NAV) is provided. The method includes: terminating receiving of a first radio frame when it is determined that a target receiving station of the first radio frame being received is not a first station; and updating an NAV of the first station or maintaining the NAV of the first station unchanged according to a remaining duration of the first radio frame and a first transmission opportunity duration carried in the first radio frame. The remaining duration of the first radio frame is transmission time used for transmitting a remaining part of the first radio frame after the receiving of the first radio frame is terminated.

Optionally, the updating the NAV of the first station or maintaining the NAV of the first station unchanged according to the remaining duration of the first radio frame and the first transmission opportunity duration carried in the first radio frame includes: determining the remaining duration of the first radio frame according to a preamble type of the first radio frame and transmission time of the first radio frame; and updating the NAV of the first station or maintaining the NAV of the first station unchanged according to the determined remaining duration of the first radio frame and the first transmission opportunity duration.

Optionally, the determining the remaining duration of the first radio frame according to the preamble type of the first radio frame and the transmission time of the first radio frame includes: determining a receiving termination position of the first radio frame at a receiving termination time according to the preamble type of the first radio frame; and determining the remaining duration of the first radio frame according to the transmission time of the first radio frame and the determined receiving termination position of the first radio frame.

Optionally, the determining the receiving termination position of the first radio frame at the receiving termination time according to the preamble type of the first radio frame includes at least one of the following: in a case where the preamble type of the first radio frame is a Single-User format or Trigger based Uplink format, determining that a time point when a High Efficiency SIGNAL field A (HE-SIG-A) in the first radio frame ends is the receiving termination position; in a case where the preamble type of the first radio frame is an Extended Range Single-User format, determining that a time point when a repeated HE-SIG-A in the first radio frame ends is the receiving termination position; in a case where the preamble type of the first radio frame is a Multiple-User format, if determining that the target receiving station is not the first station according to the HE-SIG-A in the first radio frame, determining that the time point when the HE-SIG-A in the first radio frame ends is the receiving termination position; or in the case where the preamble type of the first radio frame is the Multiple-User format, if determining that the target receiving station is not the first station according to a High Efficiency SIGNAL field B (HE-SIG-B) in the first radio frame, determining that a time point when the HE-SIG-B in the first radio frame ends is the receiving termination position.

Optionally, before or after the terminating the receiving of the first radio frame when it is determined that the target receiving station of the first radio frame being received is not the first station, the method further includes operating a first functional entity of the first station to send a receiving termination instruction to a second functional entity of the first station, wherein the receiving termination instruction is used for instructing the second functional entity to update the NAV of the first station or maintain the NAV of the first station unchanged.

Optionally, the updating the NAV of the first station or maintaining the NAV of the first station unchanged according to the remaining duration of the first radio frame and the first transmission opportunity duration carried in the first radio frame includes: operating the second functional entity to update the NAV of the first station or maintain the NAV of the first station unchanged according to a predetermined value carried in the receiving termination instruction, wherein the predetermined value is a sum of the remaining duration of the first radio frame and the first transmission opportunity duration; or operating the second functional entity to update the NAV of the first station or maintain the NAV of the first station unchanged according to the remaining duration of the first radio frame and the first transmission opportunity duration carried in the receiving termination instruction.

Optionally, the operating the second functional entity to update the NAV of the first station or maintain the NAV of the first station unchanged according to the remaining duration of the first radio frame and the first transmission opportunity duration carried in the receiving termination instruction includes: operating the second functional entity to calculate the sum of the remaining duration of the first radio frame and the first transmission opportunity duration carried in the receiving termination instruction; and operating the second functional entity to update the NAV of the first station or maintain the NAV of the first station unchanged according to the calculated sum.

Optionally, the first functional entity is used for performing at least one of the following operations: detecting a signal intensity, receiving and sending a radio frame on a wireless channel, and providing a service for the second functional entity; and/or the second functional entity is used for performing at least one of the following operations: controlling the first functional entity to access a wireless channel, receiving and decoding a data unit sent by the first functional entity, sending a data unit to the first functional entity and requesting a service, and detecting and controlling a virtual carrier.

Optionally, the updating the NAV of the first station or maintaining the NAV of the first station unchanged according to the remaining duration of the first radio frame and the first transmission opportunity duration carried in the first radio frame includes: determining whether a sum of the remaining duration of the first radio frame and the first transmission opportunity duration is greater than the NAV; in response to determining that the sum is greater than the NAV, updating the NAV of the first station by using the sum of the remaining duration of the first radio frame and the first transmission opportunity duration; and in response to determining that the sum is not greater than the NAV, maintaining the NAV of the first station unchanged.

Optionally, the updating the NAV of the first station or maintaining the NAV of the first station unchanged according to the remaining duration of the first radio frame and the first transmission opportunity duration carried in the first radio frame includes: using a predetermined variable to store the first transmission opportunity duration and using the remaining duration of the first radio frame to update a radio frame duration timer; and when a value of the radio frame duration timer is zero, determining whether the predetermined variable is greater than a value of the NAV; in response to determining that the predetermined variable is greater than the value of the NAV, using the predetermined variable to update the NAV; in response to determining that the predetermined variable is less than or equal to the NAV, maintaining the NAV of the first station unchanged; or before the value of the radio frame duration timer is zero, receiving a second radio frame; in response to determining that that a target receiving station of the second radio frame is not the first station, terminating receiving of the second radio frame and determining whether a sum of a remaining duration of the second radio frame and a second transmission opportunity duration carried in the second radio frame is greater than a sum of the predetermined variable and the value of the radio frame duration timer; in response to determining that the sum of the remaining duration of the second radio frame and the second transmission opportunity duration carried in the second radio frame is greater than the sum of the predetermined variable and the value of the radio frame duration timer, using the second transmission opportunity duration to update the predetermined variable and using the remaining duration of the second radio frame to update the radio frame duration timer; in response to determining that the sum of the remaining duration of the second radio frame and the second transmission opportunity duration carried in the second radio frame is less than or equal to the sum of the predetermined variable and the value of the radio frame duration timer, maintaining the NAV of the first station unchanged.

Optionally, the updating the NAV of the first station or maintaining the NAV of the first station unchanged according to the remaining duration of the first radio frame and the first transmission opportunity duration carried in the first radio frame includes: determining the remaining duration of the first radio frame according to a current transmission duration of the first radio frame indicated by a non-high throughput signal field of the first radio frame; and updating the NAV of the first station or maintaining the NAV of the first station unchanged according to the determined remaining duration of the first radio frame and the first transmission opportunity duration.

According to another aspect of the embodiments of the present disclosure, a device for processing a network allocation vector (NAV) is provided. The device includes: a termination module and a processing module. The termination module is configured to terminate receiving of a first radio frame when it is determined that a target receiving station of the first radio frame being received is not a first station. The processing module is configured to update an NAV of the first station or maintain the NAV of the first station unchanged according to a remaining duration of the first radio frame and a first transmission opportunity duration carried in the first radio frame. The remaining duration of the first radio frame is transmission time used for transmitting a remaining part of the first radio frame after the receiving of the first radio frame is terminated.

The embodiments of the present disclosure further provide a computer-readable storage medium storing computer-executable instructions that, when executed, implement the above-mentioned method for processing an NAV.

With the embodiments of the present disclosure, when an NAV of a station is updated, not only a transmission opportunity duration of a sending station but also a remaining duration of a radio frame sent by the sending station are taken into consideration, thereby ensuring the accuracy of an NAV update. The technical solutions solve the problem of collisions with hidden stations caused by an inaccurate NAV update in the related art, thereby ensuring the accuracy of an NAV update and the fairness of transmission and channel contention, and reducing collisions among hidden stations.

Other aspects can be understood after the accompanying drawings and detailed description are read and understood.

BRIEF DESCRIPTION OF DRAWINGS

The accompanying drawings described herein are used to provide a further understanding of the present application and form a part of the present application. The exemplary embodiments and descriptions thereof in the present application are used to explain the present application and not to limit the present application in any improper way. In the accompanying drawings:

FIG. 3 is a schematic diagram of an advanced NAV update in the related art;

FIG. 4 is a flowchart of a method for processing an NAV according to an embodiment of the present disclosure;

DETAILED DESCRIPTION

Figure 1:
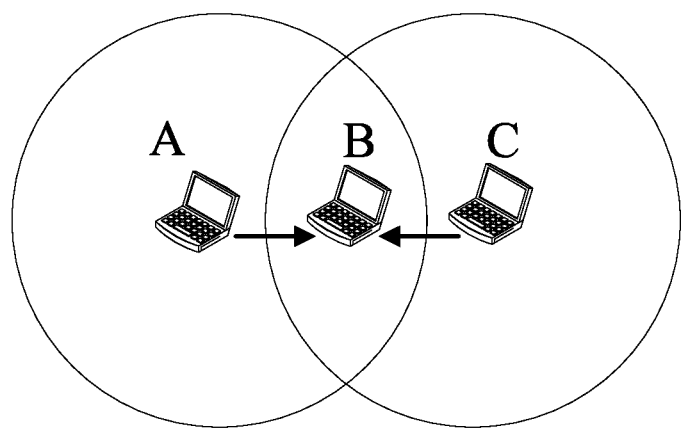
FIG. 1 is a schematic diagram of a basic service set in the related art.
Figure 2:
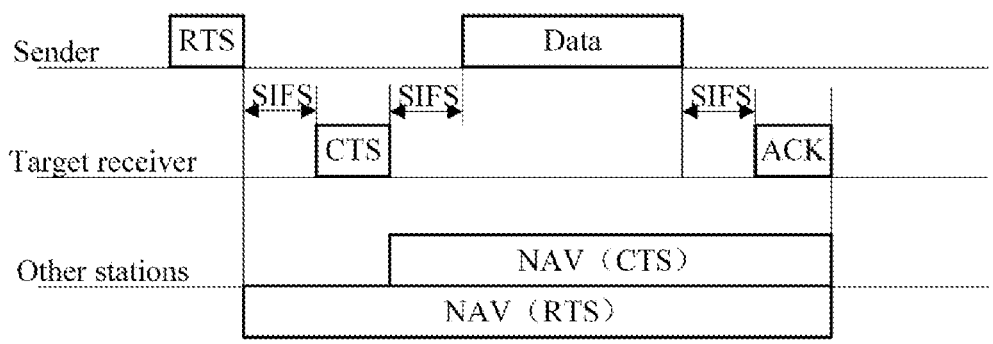
FIG. 2 is a schematic diagram of virtual carrier protection in the related art.

The present application will be described hereinafter in detail through embodiments with reference to the accompanying drawings. It is to be noted that if not in collision, the embodiments and features therein in the present application can be combined with each other.

It is to be noted that the terms "first", "second" and the like in the description, claims and drawings of the present application are used to distinguish between similar objects and are not necessarily used to describe a particular order or sequence.

In the existing art, when the receiving of a radio frame is terminated in advance, a third-party station only uses a TXOP Duration for updating an NAV, which will cause a short protection time and interference with the current transmission. For example, as shown in FIG. 3, a station A transmits a radio frame to a station B, and a station C is an auditor station. Since the station B and the station C are the hidden station to each other, the station C detects the physical layer frame header of the radio frame transmitted by station A and determines that the radio frame contains no data related to itself, and the station C chooses to abandon the radio frame and update an NAV. If an MAC layer of the third-party station only uses the TXOP Duration for updating the NAV after receiving a receiving termination instruction of the PHY layer, the protection time will be advanced (as shown by the dashed line in FIG. 3), causing that the time that should be protected (as shown by the solid line in FIG. 3) is not protected. In this way, the station C will contend for a channel for transmission and interfere with an acknowledgement (ACK) message transmitted by the station B, causing a collision.

To solve the problem described above, the embodiments of the present disclosure provide a method for processing an NAV. FIG. 4 is a flowchart of the method for processing the NAV according to the embodiment of the present disclosure. As shown in FIG. 4, the method includes the steps described below.

In step S402, the receiving of a first radio frame is terminated when it is determined that a target receiving station of the first radio frame being received is not a first station (corresponding to the third-party station described above).

In step S404, an NAV of the first station is updated or maintained unchanged according to a remaining duration of the first radio frame and a first transmission opportunity duration carried in the first radio frame, where the remaining duration of the first radio frame is transmission time used for transmitting the remaining part of the first radio frame after the receiving of the first radio frame is terminated.

The operations described above may be performed by the first station. The first transmission opportunity duration is the time occupied by transmitting data between the sending station of the first radio frame and the target receiving station of the first radio frame. The first radio frame is a radio frame being received, that is, the current radio frame.

With the steps described above, when the NAV of the first station is updated, not only the first transmission opportunity duration but also the remaining duration of the first radio frame are taken into consideration, thereby avoiding the advancement of the protection time and ensuring the accuracy of the NAV update. The technical solution solves the problem of collisions with hidden stations caused by an inaccurate NAV update in the related art, thereby ensuring the accuracy of the NAV update and the fairness of transmission and channel contention, and reducing collisions with hidden stations.

In an optional embodiment, in step S404, the step in which the NAV of the first station is updated or maintained unchanged according to the remaining duration of the first radio frame and the first transmission opportunity duration carried in the first radio frame may include: determining the remaining duration of the first radio frame according to a preamble type of the first radio frame and transmission time of the first radio frame; and updating the NAV of the first station or maintaining the NAV of the first station unchanged according to the determined remaining duration of the first radio frame and the first transmission opportunity duration carried in the first radio frame. Optionally, the first transmission opportunity duration may be determined according to the transmission opportunity duration field of the HE-SIG-A in the first radio frame.

In an optional embodiment, the step in which the remaining duration of the first radio frame is determined according to the preamble type of the first radio frame and the transmission time of the first radio frame includes: determining a receiving termination position of the first radio frame at a receiving termination time according to the preamble type of the first radio frame; and determining the remaining duration of the first radio frame according to the transmission time of the first radio frame and the determined receiving termination position of the first radio frame. In the present embodiment, the receiving termination positions of radio frames with different preamble types may be different. Therefore, when the remaining duration of the first radio frame is determined according to the preamble type of the first radio frame and the transmission time of the first radio frame, firstly, the receiving termination position of the first radio frame corresponding to this preamble type may be determined according to the preamble type of the first radio frame; and then, after the receiving termination position of the first radio frame is determined, the remaining duration of the first radio frame may be determined according to the difference between the transmission time of the first radio frame and the determined receiving termination position.

The corresponding relationship between the preamble type of the first radio frame and the receiving termination position of the first radio frame is described below.

In an optional embodiment, the step in which the receiving termination position of the first radio frame at the receiving termination time is determined according to the preamble type of the first radio frame includes at least one of the steps described below.

In the case where the preamble type of the first radio frame is a Single-User format or Trigger based Uplink format, the time point when the HE-SIG-A in the first radio frame ends is determined to be the receiving termination position.

In the case where the preamble type of the first radio frame is an Extended Range Single-User format, the time point when the repeated HE-SIG-A in the first radio frame ends is determined to be the receiving termination position.

In the case where the preamble type of the first radio frame is a Multiple-User format, when it is determined that the target receiving station is not the first station according to the HE-SIG-A in the first radio frame, the time point when the HE-SIG-A in the first radio frame ends is determined to be the receiving termination position.

In the case where the preamble type of the first radio frame is Multiple-User format, when it is determined that the target receiving station is not the first station according to the HE-SIG-B in the first radio frame, the time point when the HE-SIG-B in the first radio frame ends is determined to be the receiving termination position.

Therefore, the receiving termination position of the first radio frame may be determined according to the preamble type of the first radio frame.

In an optional embodiment, the steps described above may be performed by the first station; the step S402 may be performed by a first functional entity of the first station; the step S404 may be performed by a second functional entity of the first station. By way of example, the embodiment of the present disclosure is described below by using the first station to perform the steps described above. Before or after the step S402, the following operation may be performed. The first functional entity of the first station sends a receiving termination instruction to the second functional entity of the first station, where the receiving termination instruction is used for instructing the second functional entity to update the NAV of the first station or maintain the NAV of the first station unchanged. In the present embodiment, two functional entities may be disposed in the first station, that is, the first functional entity and the second functional entity. The two functional entities may perform different actions. The first functional entity may determine the destination station of the first radio frame and send a corresponding instruction to the second functional entity according to the determination result; and the second functional entity may perform a corresponding action according to the instruction from the first functional entity, for example, the second functional entity may determine whether the NAV of the first station needs to be updated according to the receiving termination instruction from the first functional entity and perform corresponding processing according to the determination result. In the present embodiment, after the first functional entity receives the first radio frame and determines that the target receiving station of the first radio frame is not the first station, the order of the action of terminating the receiving of the first radio frame and the action of sending the receiving termination instruction to the second functional entity is not limited. The first functional entity and the second functional entity may be located in different layers of the first station. For example, the first functional entity may be located in a physical layer of the first station and perform functions implementable by the physical layer. The second functional entity may be located in an MAC layer of the first station and perform functions implementable by the MAC layer.

The above embodiment illustrates that the first station may perform the steps shown in FIG. 4. How the first station performs the step S404 will be described below.

In an optional embodiment, the step in which the NAV of the first station is updated or maintained unchanged according to the remaining duration of the first radio frame and the first transmission opportunity duration carried in the first radio frame includes: the second functional entity updating the NAV of the first station or maintaining the NAV of the first station unchanged according to a predetermined value carried in the receiving termination instruction, where the predetermined value is a sum of the remaining duration of the first radio frame and the first transmission opportunity duration; or, the second functional entity updating the NAV of the first station or maintaining the NAV of the first station unchanged according to the remaining duration of the first radio frame and the first transmission opportunity duration carried in the receiving termination instruction. In the present embodiment, the receiving termination instruction is sent by the first functional entity to the second functional entity. Therefore, the sum of the remaining duration of the first radio frame and the first transmission opportunity duration may be carried in the first radio frame after being determined by the first functional entity; or, the first functional entity may directly use the receiving termination instruction to carry the remaining duration of the first radio frame and the first transmission opportunity duration.

In an optional embodiment, the step in which the second functional entity updates the NAV of the first station or maintains the NAV of the first station unchanged according to the remaining duration of the first radio frame and the first transmission opportunity duration carried in the receiving termination instruction includes: the second functional entity calculating the sum of the remaining duration of the first radio frame and the first transmission opportunity duration carried in the receiving termination instruction; and the second functional entity updating the NAV of the first station or maintaining the NAV of the first station unchanged according to the calculated sum. In the present embodiment, when the first radio frame carries the remaining duration of the first radio frame and the first transmission opportunity duration, the second functional entity may determine the sum and determine whether the NAV of the first station needs to be updated according to the determined sum of the remaining duration of the first radio frame and the first transmission opportunity duration.

The operations performed by the first functional entity and the second functional entity according to the above-mentioned embodiments are described below.

In an optional embodiment, the first functional entity may be used for performing at least one of the following operations: detecting a signal intensity, receiving and sending a radio frame on a wireless channel, providing a service for the second functional entity (including, but not limited to, sending the receiving termination instruction to the second functional entity), and the like. In another optional embodiment, the second functional entity may be used for performing at least one of the following operations: controlling the first functional entity to access a wireless channel, receiving and decoding a data unit sent by the first functional entity, sending a data unit to the first functional entity and requesting a service, detecting and controlling a virtual carrier, and the like.

In an optional embodiment, the step in which the NAV of the first station is updated or maintained unchanged according to the remaining duration of the first radio frame and the first transmission opportunity duration carried in the first radio frame includes: determining whether the sum of the remaining duration of the first radio frame and the first transmission opportunity duration is greater than the NAV; if the sum is greater than the NAV, updating the NAV of the first station according to the sum of the remaining duration of the first radio frame and the first transmission opportunity duration; if the sum is not greater than the NAV, maintaining the NAV of the first station unchanged.

In practical applications, one station (for example, the first station) may have multiple corresponding hidden stations. The first station may only receive a radio frame sent by one hidden station, and may also receive radio frames sent by different hidden stations. The radio frames sent by different hidden stations may carry different transmission opportunity durations. In this case, the first station needs to update the NAV according to the radio frames sent by different hidden stations.

The above step S404 will be described below in conjunction with the above two cases.

In an optional embodiment, the step in which the NAV of the first station is updated or maintained unchanged according to the remaining duration of the first radio frame and the first transmission opportunity duration carried in the first radio frame includes: using a predetermined variable to store the first transmission opportunity duration and using the remaining duration of the first radio frame to update a radio frame duration timer (the radio frame duration timer may be configured in advance); when the radio frame duration timer is zero, determining whether the predetermined variable is greater than the NAV; if the predetermined variable is greater than the NAV, using the predetermined variable to update the NAV; if the predetermined variable is less than or equal to the NAV, maintaining the NAV of the first station unchanged.

In another optional embodiment, before the radio frame duration timer is reset, a second radio frame is received. When it is determined that a target receiving station of the second radio frame is not the first station, whether the sum of a remaining duration of the second radio frame and a second transmission opportunity duration carried in the second radio frame is greater than the sum of the predetermined variable and the value of the radio frame duration timer is determined. If the sum of the remaining duration of the second radio frame and the second transmission opportunity duration carried in the second radio frame is greater than the sum of the predetermined variable and the value of the radio frame duration timer, the second transmission opportunity duration is used for updating the predetermined variable and the remaining duration of the second radio frame is used for updating the radio frame duration timer. If the sum of the remaining duration of the second radio frame and the second transmission opportunity duration carried in the second radio frame is less than or equal to the sum of the predetermined variable and the value of the radio frame duration timer, the NAV of the first station is maintained unchanged. In the present embodiment, after the predetermined variable and the radio frame duration timer are updated, the above operations for updating the NAV or the operations for maintaining the NAV of the first station will be repeated. That is, when the radio frame duration timer is zero again, whether the predetermined variable is greater than the NAV of the first station is determined; if the predetermined variable is greater than the NAV, the predetermined variable is used to update the NAV; if the predetermined variable is less than or equal to the NAV, the NAV of the first station is maintained unchanged.

The above-mentioned embodiments involve the calculation of the radio frame duration (i.e., the transmission time of the radio frame). The following formula may be used for calculating the radio frame duration (i.e., the following RXTIME):

$$RXTIME = \left\lceil \frac{LENGTH + 3}{3} \right\rceil * 4 + 20.$$

In this formula, LENGTH denotes a value of LENGTH in a non-high throughput (HT) SIGNAL field (referred to as L-SIG).

It is to be noted that the calculation of the radio frame duration and all the calculations in the embodiment described below are performed with unified units.

Table 1 lists symbols used in the subsequent calculations and meanings thereof.

TABLE 1

| Symbol | Meaning |
| --- | --- |
| $T_{L\text{-}STF}$ | Non-HT Short Training field duration |
| $T_{L\text{-}LTF}$ | Non-HT Long Training field duration |
| $T_{L\text{-}SIG}$ | Non-HT SIGNAL field duration |
| $T_{RL\text{-}SIG}$ | Repeat Non-HT SIGNAL field duration |
| $T_{HE\text{-}SIG\text{-}A}$ | HE SIGNAL A field duration |
| $T_{HE\text{-}SIG\text{-}A\text{-}R}$ | Repeat HE SIGNAL A field duration |
| $T_{HE\text{-}SIG\text{-}B}$ | HE SIGNAL B field duration |

In practical applications, a station (for example, the first station) receives a radio frame (corresponding to the first radio frame), and if the HE-SIG-A is received and verified to be accurate, it is determined, according to the received information, that the current radio frame is an HE SU PHY protocol data unit (PPDU) (i.e., a radio frame whose preamble type is a Single-User format) or an HE Trigger-based PPDU (i.e., a radio frame whose preamble type is a Trigger based Uplink format). After the HE-SIG-A is received, if the station determines that the radio frame is not a radio frame sent to the station itself, the station terminates the current receiving and calculates the duration of the remaining part of the radio frame. The calculation method is as follows:

$$RTIME = RXTIME - T_{L\text{-}STF} - T_{L\text{-}LTF} - T_{L\text{-}SIG} - T_{RL\text{-}SIG} - T_{HE\text{-}SIG\text{-}A}$$

If the station determines that the radio frame is an HE Extended Range SU PPDU (i.e., a radio frame whose preamble type is an Extended Range Single-User format) and if the station determines that the radio frame is not a radio frame sent to the station itself after the repeated HE-SIG-A in the radio frame is received, the station terminates the current receiving and calculates the duration of the remaining part of the radio frame. The calculation method is as follows:

$$RTIME = RXTIME - T_{L\text{-}STF} - T_{L\text{-}LTF} - T_{L\text{-}SIG} - T_{RL\text{-}SIG} - T_{HE\text{-}SIG\text{-}A} - T_{HE\text{-}SIG\text{-}A}$$

If the station determines that the radio frame is a HE MU PPDU (i.e., a radio frame whose preamble type is a Multiple-User format), and after the HE-SIG-A is received, the station determines that the radio frame is not a radio frame sent to itself, the station terminates the current receiving and calculates the duration of the remaining part of the radio frame. The calculation method is as follows:

$$RTIME = RXTIME - T_{L\text{-}STF} - T_{L\text{-}LTF} - T_{L\text{-}SIG} - T_{RL\text{-}SIG} - T_{HE\text{-}SIG\text{-}A} - T_{HE\text{-}SIG\text{-}B}$$

If the station determines that the radio frame is a HE MU PPDU, and after the HE-SIG-B is received, the station determines that the radio frame is not a radio frame sent to itself or that the HE-SIG-B is received wrongly, the station terminates the current receiving and calculates the duration of the remaining part of the radio frame. The calculation method is as follows:

$$RTIME = RXTIME - T_{L\text{-}STF} - T_{L\text{-}LTF} - T_{L\text{-}SIG} - T_{RL\text{-}SIG} - T_{HE\text{-}SIG\text{-}A} - T_{HE\text{-}SIG\text{-}B}$$

In an optional embodiment, the station may further determine the remaining duration of the radio frame according to the current transmission duration of the radio frame indicated by the L-SIG of the radio frame.

Then, the station calculates a value used for updating the NAV. The calculation method is as follows:

$$TXOPTIME = RTIME + TXOP\_DURATION$$

Figure 5:
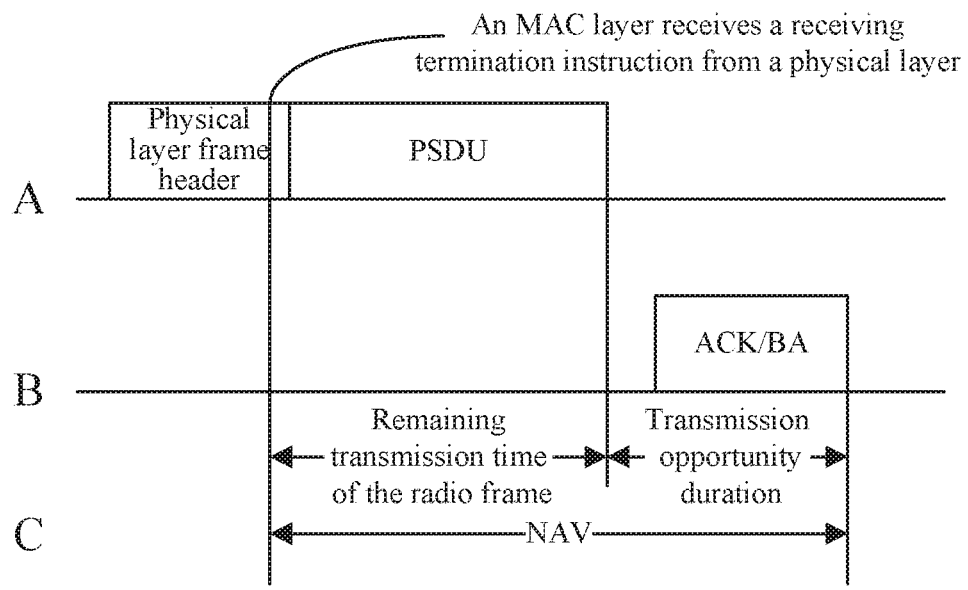
FIG. 5 is a schematic diagram of an accurate NAV update according to an embodiment of the present disclosure.

Optionally, the PHY layer (corresponding to the first functional entity) of the station sends a PHY-RXEND.indication primitive to the MAC layer (corresponding to the second functional entity) of the station to indicate termination in advance, and the PHY-RXEND.indication primitive includes TXOPTIME. Alternatively, the primitive includes RTIME and TXOP_DURATION, and the MAC layer performs a calculation, that is, the MAC layer calculates the sum of RTIME and TXOP_DURATION to obtain TXOPTIME. After the MAC layer of the station receives the PHY-RXEND.indication primitive instructing that the receiving be terminated in advance, the MAC layer compares the TXOPTIME included in the PHY-RXEND.indication primitive (or the TXOPTIME calculated by the MAC layer) with the current NAV of the station. If the TXOPTIME is greater than the current NAV, the NAV is updated by using the TXOPTIME; otherwise, the current NAV is maintained unchanged. The NAV updated by the above manner is more accurate. Reference can be made to FIG. 5.

The embodiments of the present disclosure will be described below through specific embodiments.

Embodiment 1

In the present embodiment, AP1, STA1, and STA2 constitute a BSS. A sending station STA1 obtains a transmission opportunity and then sends an HE SU PPDU (corresponding to the first radio frame), AP1 is a target receiving station, and STA2 is an auditor station (corresponding to the first station). When STA1 sends the HE SU PPDU, STA1 indicates a transmission opportunity duration TXOP_DURATION, a BSS color, and uplink and downlink instructions in the HE-SIG-A of the HE SU PPDU.

If STA2 determines that the radio frame is an HE SU PPDU according to preamble information, after STA2 receives the HE-SIG-A of the HE SU PPDU and the HE-SIG-A is verified to be accurate, STA2 determines that STA2 is not the target receiving station of the HE SU PPDU. Then STA2 determines to terminate the receiving in advance and calculates the duration RTIME(us) of the remaining part of the radio frame. The calculation method is as follows:

$$R\text{TIME}=RX\text{TIME}-T_{L\text{-}STF}-T_{L\text{-}LTF}-T_{L\text{-}SIG}-T_{RL\text{-}SIG}-T_{HE\text{-}SIG\text{-}A};$$

Then, STA2 calculates a value used for updating an NAV by using the following formula:

$$TXOP\text{TIME}=R\text{TIME}+TXOP\_\text{DURATION};$$

STA2 compares TXOPTIME with the current NAV of STA2. If the TXOPTIME is greater than the current NAV, the NAV is updated with the TXOPTIME; otherwise, the current NAV is maintained unchanged.

Embodiment 2

In the present embodiment, AP1, STA1, and STA2 constitute a BSS. A sending station STA1 sends a HE Trigger-based PPDU (corresponding to the first radio frame), AP1 is a target receiving station, and STA2 is an auditor station (corresponding to the first station).

If STA2 determines that the radio frame is a HE Trigger-based PPDU according to preamble information, after STA2 receives the HE-SIG-A of the HE Trigger-based PPDU and verifies the HE-SIG-A to be accurate, STA2 determines that STA2 is not the target receiving station of the HE Trigger-based PPDU. Then STA2 determines to terminate the receiving in advance and calculates the duration of the remaining part of the radio frame. The calculation method of the duration of the remaining part of the radio frame is as follows:

$$R\text{TIME}=RX\text{TIME}-T_{L\text{-}STF}-T_{L\text{-}LTF}-T_{L\text{-}SIG}-T_{RL\text{-}SIG}-T_{HE\text{-}SIG\text{-}A};$$

Then, STA2 calculates a value used for updating an NAV by using the following formula:

$$TXOP\text{TIME}=R\text{TIME}+TXOP\_\text{DURATION};$$

STA2 compares TXOPTIME with the current NAV of STA2. If the TXOPTIME is greater than the current NAV, the NAV is updated by using the TXOPTIME; otherwise, the current NAV is maintained unchanged.

Embodiment 3

In the present embodiment, AP1, STA1, and STA2 constitute a BSS. A sending station STA1 obtains a transmission opportunity and sends a HE Extended Range SU PPDU (corresponding to the first radio frame), AP1 is a target receiving station, and STA2 (corresponding to the first station) is an auditor station. When STA1 sends the HE Extended Range SU PPDU, STA1 indicates a transmission opportunity duration, a BSS color, and uplink and downlink instructions in the HE-SIG-A of the HE Extended Range SU PPDU.

When STA2 determines that the radio frame is a HE Extended Range SU PPDU according to preamble information and receives the repeated HE-SIG-A of the HE Extended Range SU PPDU, and the HE-SIG-A is verified to be accurate, STA2 determines that STA2 is not the target receiving station of the HE Extended Range SU PPDU. Then STA2 determines to terminate the receiving in advance and calculates the duration of the remaining part of the radio frame. The calculation method is as follows:

$$R\text{TIME}=RX\text{TIME}-T_{L\text{-}STF}-T_{L\text{-}LTF}-T_{L\text{-}SIG}-T_{RL\text{-}SIG}-T_{HE\text{-}SIG\text{-}A}-T_{HE\text{-}SIG\text{-}A\text{-}R};$$

Then, STA2 calculates a value used for updating an NAV by using the following formula:

$$TXOP\text{TIME}=R\text{TIME}+TXOP\_\text{DURATION};$$

STA2 compares TXOPTIME with the current NAV of STA2. If the TXOPTIME is greater than the current NAV, the NAV is updated by using the TXOPTIME; otherwise, the current NAV is maintained unchanged.

Embodiment 4

In the present embodiment, AP1, STA1, and STA2 constitute a BSS and the generated BSS color is 1. AP2 and STA3 (corresponding to the first station) constitute a BSS and the generated BSS color is 2. STA3 can sense a radio frame sent by AP1.

AP1 obtains a transmission opportunity and sends a HE MU PPDU (corresponding to the first radio frame), and the target receiving stations are STA1 and STA2. When AP1 sends the HE MU PPDU, AP1 indicates a transmission opportunity duration and the BSS color (equal to 1) in the HE-SIG-A of the HE MU PPDU.

When STA3 determines that the radio frame is a HE MU PPDU according to preamble information and receives the HE-SIG-A of the HE MU PPDU, and the HE-SIG-A is verified to be accurate, STA3 determines that the radio frame is not a radio frame sent by an AP of the BSS to which STA3 belongs according to the BSS color. Then STA3 determines to terminate the receiving in advance and calculates the duration of the remaining part of the radio frame. The calculation method is as follows:

$$R\text{TIME}=R X\text{TIME}-T_{L\text{-}STF}-T_{L\text{-}LTF}-T_{L\text{-}SIG}-T_{RL\text{-}SIG}-T_{HE\text{-}SIG\text{-}A};$$

Then, STA3 calculates a value used for updating an NAV by using the following formula:

$$TXOP\text{TIME}=R\text{TIME}+TXOP\_\text{DURATION};$$

STA3 compares TXOPTIME with the current NAV of STA3. If the TXOPTIME is greater than the current NAV, the NAV is updated by using the TXOPTIME; otherwise, the current NAV is maintained unchanged.

Embodiment 5

In the present embodiment, AP1, STA1, STA2, and STA3 (corresponding to the first station) constitute a basic service set (BSS) and the generated BSS color is 1.

AP1 obtains a transmission opportunity and then sends a HE MU PPDU (corresponding to the first radio frame). The target receiving stations are STA1 and STA2. When AP1 sends the HE MU PPDU, AP1 indicates a transmission opportunity duration and the BSS color (equal to 1) in the HE-SIG-A of the HE MU PPDU and indicates identifiers and corresponding resource positions of STA1 and STA2 in the HE-SIG-B.

When STA3 determines that the radio frame is a HE MU PPDU according to preamble information and receives the HE-SIG-A of the HE MU PPDU, and the HE-SIG-A is verified to be accurate, STA3 determines that the radio frame is a radio frame sent by an AP of the BSS to which STA3 belongs according to the BSS color and uplink and downlink instructions. Then STA3 proceeds to receive the HE-SIG-B and determines that the radio frame contains no its own data according to the HE-SIG-B, that is, STA3 is not the target receiving station of the HE MU PPDU. Then STA3 determines to terminate the receiving in advance and calculates the duration of the remaining part of the radio frame. The calculation method is as follows:

$$R\text{TIME}=R X\text{TIME}-T_{L\text{-}STF}-T_{L\text{-}LTF}-T_{L\text{-}SIG}-T_{RL\text{-}SIG}-T_{HE\text{-}SIG\text{-}A}-T_{HE\text{-}SIG\text{-}B};$$

Then, STA3 calculates a value used for updating an NAV by using the following formula:

$$TXOP\text{TIME}=R\text{TIME}+TXOP\_\text{DURATION};$$

STA3 compares TXOPTIME with the current NAV of STA3. If the TXOPTIME is greater than the current NAV, the NAV is updated by using the TXOPTIME; otherwise, the current NAV is maintained unchanged.

Embodiment 6

Figure 6:
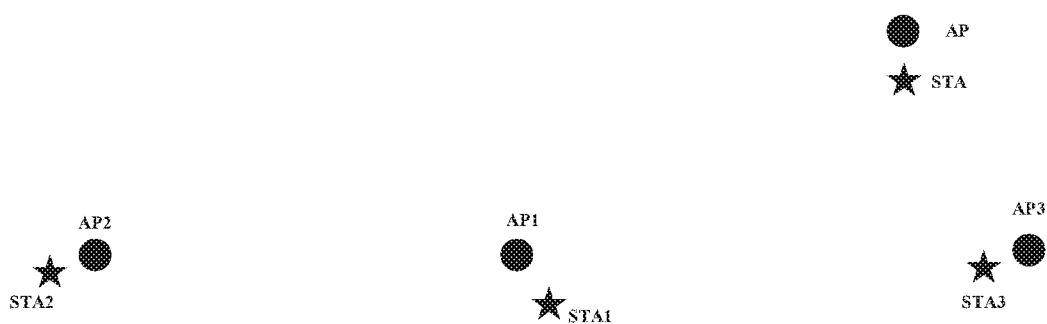
FIG. 6 is a topology diagram of a BSS according to embodiment 6 of the present disclosure.

FIG. 6 is a topology diagram of a BSS according to the embodiment 6 of the present disclosure. As shown in FIG. 6, AP1 and STA1 constitute a BSS, the BSS color is 1, the bandwidth of the working channel is 40 MHz, and the channel is numbered with 1 and 2 in a unit of 20 MHz. 20 MHz numbered 1 is a main channel. AP2 and STA2 constitute a BSS, the BSS color is 2, the working channel bandwidth is 20 MHz, and AP2 and STA2 work on the channel numbered 2, that is, they work on an auxiliary channel of the working channel of AP1. AP3 (corresponding to the first station) and STA3 constitute a BSS, the BSS color is 3, the bandwidth of the working channel is 20 MHz, and AP3 as well as STA3 work on the channel numbered 2, that is, they work on the auxiliary channel of the working channel of AP1. AP3 and AP2 cannot sense each other.

Figure 7:
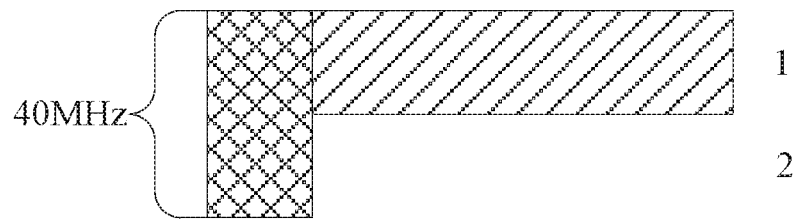
FIG. 7 is a schematic diagram of sending only a preamble on a channel whose auxiliary channel is busy according to an embodiment of the present disclosure.

AP2 obtains a channel transmission opportunity and sends a HE SU PPDU (corresponding to the first radio frame) to STA2. AP1 contends for the channel for transmission, and determines that the auxiliary channel is busy when the main channel backs off to 0. At this time, AP1 sends data on the main channel, but sends a preamble (as shown in FIG. 7) on the auxiliary channel. The HE-SIG-A of the preamble sent on the auxiliary channel indicates that the BSS color is 1.

When AP3 determines that the radio frame is a HE SU PPDU according to preamble information, after AP3 receives the HE-SIG-A of the HE SU PPDU sent by AP1 and verifies the HE-SIG-A to be accurate, AP3 determines that AP3 is not the target receiving station of the HE SU PPDU according to the BSS color. Then AP3 determines to terminate the receiving in advance and calculates the duration of the remaining part of the radio frame. The calculation method is as follows:

$$R\text{TIME}=R X\text{TIME}-T_{L\text{-}STF}-T_{L\text{-}LTF}-T_{L\text{-}SIG}-T_{RL\text{-}SIG}-T_{HE\text{-}SIG\text{-}A};$$

Then, AP3 calculates a value for updating an NAV by using the following formula:

$$TXOP\text{TIME}=R\text{TIME}+TXOP\_\text{DURATION};$$

AP3 compares TXOPTIME with the current NAV of AP3. If the TXOPTIME is greater than the current NAV, the NAV is updated by using the TXOPTIME; otherwise, the current NAV is maintained unchanged.

Embodiment 7

In the present embodiment, AP1, STA1, and STA2 constitute a BSS. A sending station STA1 obtains a transmission opportunity and then sends a HE SU PPDU (corresponding to the first radio frame), AP1 is a target receiving station, and STA2 (corresponding to the first station) is an auditor station. When STA1 sends the HE SU PPDU, STA1 indicates a transmission opportunity duration, a symbol length and quantity of a HE LTF, a BSS color, and uplink and downlink instructions in the HE-SIG-A of the HE SU PPDU.

When STA2 determines that the radio frame is a HE SU PPDU according to preamble information, after STA2 receives the HE-SIG-A of the HE SU PPDU and verifies the HE-SIG-A to be accurate, STA2 determines that STA2 is not the target receiving station of the HE SU PPDU. Then a physical layer entity (corresponding to the first functional entity) of STA2 will generate a receiving termination instruction primitive, PHY-EXEND.indication, and the primitive indicates a reason for abandoning the PPDU and a receiving parameter. Then the PHY layer of STA2 calculates the duration of the remaining part of the radio frame. The calculation method is as follows:

$$R\text{TIME}=R X\text{TIME}-T_{L\text{-}STF}-T_{L\text{-}LTF}-T_{L\text{-}SIG}-T_{RL\text{-}SIG}-T_{HE\text{-}SIG\text{-}A};$$

Then, the PHY layer of STA2 calculates a value for updating an NAV by using the following formula:

$$TXOP\text{TIME}=R\text{TIME}+TXOP\_\text{DURATION};$$

The PHY layer of STA2 transfers TXOPTIME, as the receiving parameter of the PHY-RXEND.indication, to an MAC layer of STA2.

The MAC layer of STA2 compares the TXOPTIME with the current NAV of STA2. If the TXOPTIME is greater than the current NAV, the NAV is updated by using the TXOP-TIME; otherwise, the current NAV is maintained unchanged.

Embodiment 8

In the present embodiment, the method according to the embodiments of the present disclosure will be described by taking that a first functional entity is located in a physical layer and a second functional entity is located in an MAC layer as an example.

AP1, STA1, and STA2 constitute a BSS and the generated BSS color is 1. AP2 and STA3 (corresponding to the first station) constitute a BSS and the generated BSS color is 2. STA3 can sense a radio frame sent by AP1.

AP1 obtains a transmission opportunity and then sends an HE MU PPDU (corresponding to the first radio frame), and the target receiving stations are STA1 and STA2. When AP1 sends the HE MU PPDU, AP1 indicates a transmission opportunity duration, a symbol length and quantity of an HE LTF, a BSS color (equal to 1) and uplink and downlink instructions, and a symbol number occupied by the HE-SIG-B in the HE-SIG-A of the HE MU PPDU.

When STA3 determines that the radio frame is an HE MU PPDU according to preamble information, after STA3 receives the HE-SIG-A of the HE MU PPDU and verifies the HE-SIG-A to be accurate, STA3 determines that STA3 is not the target receiving station of the HE MU PPDU according to the BSS color. Then STA3 determines to terminate the receiving in advance and calculates the duration of the remaining part of the HE MU PPDU.

$$RTIME = RXTIME - T_{L\text{-}STF} - T_{L\text{-}LTF} - T_{L\text{-}SIG} - T_{RL\text{-}SIG} - T_{HE\text{-}SIG\text{-}A};$$

Figure 8:
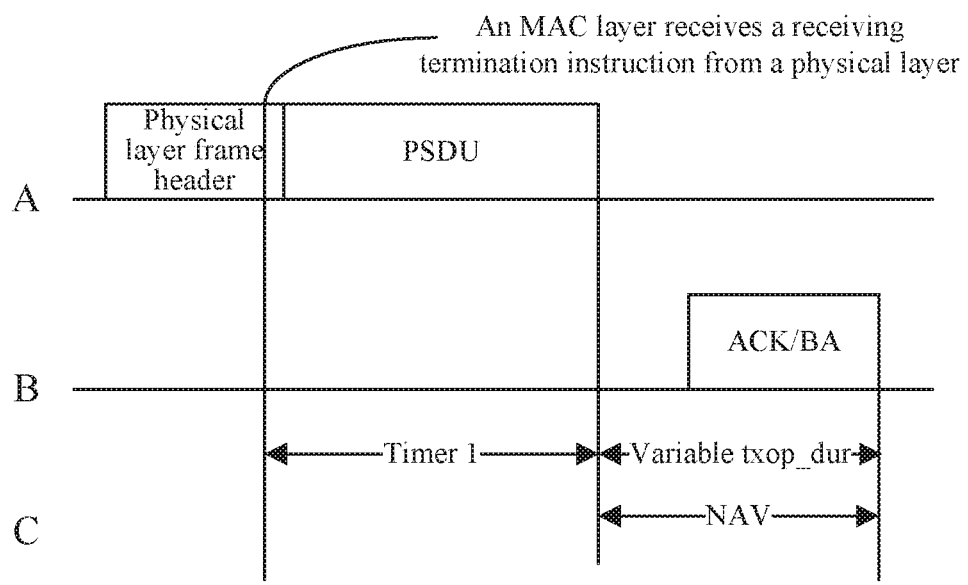
FIG. 8 is a schematic diagram of updating an NAV by using a timer according to an embodiment of the present disclosure.

In STA3 there exists a timer, timer1 (corresponding to the radio frame duration timer), used for locating the end time of the HE MU PPDU. If an MAC layer of STA3 obtains RTIME, the timer1 is 0, and the calculated RTIME1 is used for updating timer1. Moreover, a variable, txop_dur (corresponding to the predetermined variable), is used for storing TXOP_DURATION. When the timer1 becomes 0, the txop_dur is compared with the current NAV of STA3. If the txop_dur is greater than the current NAV, the NAV is updated by using the txop_dur; otherwise, the current NAV is maintained unchanged, as shown in FIG. 8.

Figure 9:
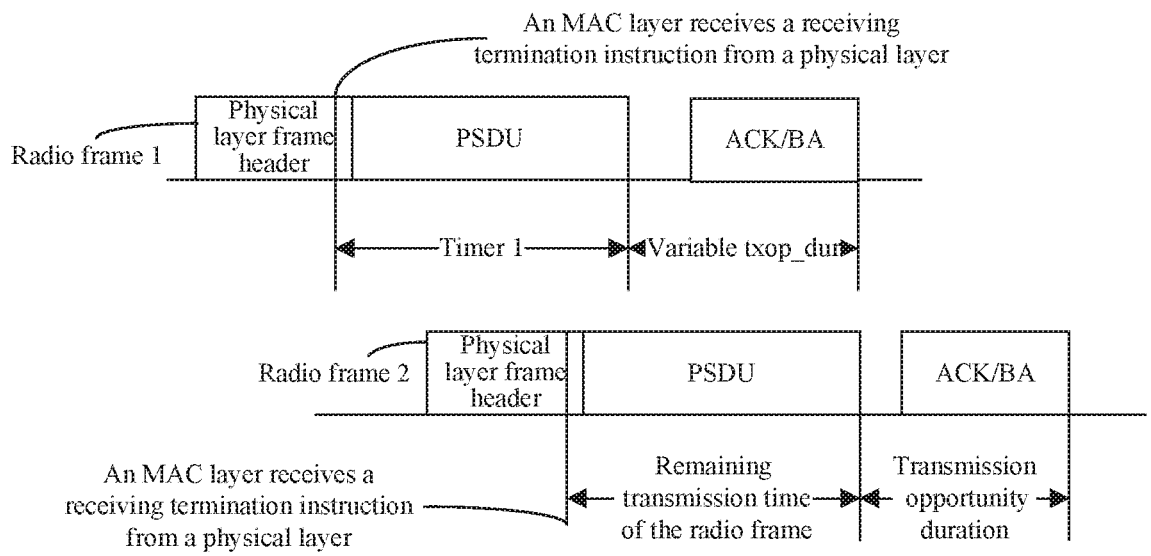
FIG. 9 is a schematic diagram of updating an NAV by using a timer in a complicated case according to an embodiment of the present disclosure.

A more complicated case is shown in FIG. 9. After STA3 receives a radio frame 1 (corresponding to the first radio frame), STA3 determines that STA3 is not the target receiving station of the radio frame according to the HE-SIG-A or the HE-SIG-B and calculates RTIME1 and TXOP_DURATION1.

In STA3 there exists a timer, timer1, used for locating the end time of the HE MU PPDU. STA3 obtains a duration of the remaining HE MU PPDU and timer1 is 0; then the calculated duration of the remaining HE MU PPDU is used for updating RTIME1, and timer 1 decreases with time. Moreover, the variable, txop_dur, is used for storing TXOP_DURATION.

Before timer1 becomes 0, the PHY layer of STA3 receives a new radio frame, a radio frame 2 (corresponding to the second radio frame). STA3 determines that STA3 is not a target receiving station of the radio frame according to the HE-SIG-A or the HE-SIG-B of the radio frame 2 and calculates RTIME2 and TXOP_DURATION2 of the radio frame 2.

At this time, since timer1 is not 0, STA3 compares the sum of RTIME2 and TXOP_DURATION2 with the sum of timer1 and txop_dur. If the sum of RTIME2 and TXOP_DURATION2 is greater than the sum of timer1 and the txop_dur, RTIME2 is used for updating timer1 and the txop_dur is used for storing TXOP_DURATION2; Otherwise, timer1 and the txop_dur are maintained unchanged.

Embodiment 9

In the present embodiment, the method according to the embodiments of the present disclosure will be described using an example in which a first functional entity is located in a physical layer and a second functional entity is located in an MAC layer.

AP1, STA1, and STA2 constitute a BSS and the BSS color is 1. AP2 and STA3 (corresponding to the first station) constitute a BSS and the BSS color is 2. STA3 can sense a radio frame sent by AP1.

AP1 obtains a transmission opportunity and then sends an HE MU PPDU (corresponding to the first radio frame), and the target receiving stations are STA1 and STA2. When AP1 sends the HE MU PPDU, AP1 indicates a transmission duration for the current packet in the L-SIG of the HE MU PPDU, and indicates, in the HE-SIG-A of the HE MU PPDU, a transmission opportunity duration, a symbol length and quantity of an HE LTF, a BSS color (equal to 1) and uplink and downlink instructions, and the number of symbols occupied by the HE-SIG-B.

After STA3 receives the HE MU PPDU sent by AP1, STA3 calculates the transmission duration of the current HE MU PPDU according to a parameter in the L-SIG and maintains a timer in the physical layer. The end to which the timer points is a time when the current PPDU transmission ends. The value of the timer decreases with time.

When STA3 determines that the HE MU PPDU is a frame of an Overlap Basic Service Set (OBSS) according to the HE SIG A of the HE MU PPDU, the packet may be filtered. At this time, a PHY layer of STA3 transfers PHY-RXEND-.indication(Filtered) to an MAC layer of STA3, the duration of the remaining radio frame is indicated in the primitive, and the duration of the remaining radio frame is a value of the timer in the physical layer. In addition, the transmission opportunity duration is also indicated in the primitive.

In addition, the above parameters may be transferred in PHY-RXSTART.indication. The PHY layer of STA3 transfers PHY-RXSTART.indication to the MAC layer of STA3, and the duration of the remaining radio frame is indicated in the primitive, which is the value of the timer in the physical layer. In addition, the transmission opportunity duration is also indicated in the primitive.

The MAC layer of STA3 compares the sum of the duration of the remaining radio frame and the transmission opportunity duration indicated in the primitive transferred by the physical layer with the current NAV of STA3. If the sum is greater than the current NAV, the NAV is updated by using the sum; otherwise, the current NAV is maintained unchanged.

In the embodiment described above, the HE MU PPDU is sent, but HE SU PPDU, HE extended range SU PPDU, and HE trigger-based PPDU may be also sent in the embodiment described above. In the embodiment described above, a sender is an AP and a receiver is an STA; or, the sender may be an STA and the receiver may be an AP.

Embodiment 10

AP1, STA1, and STA2 constitute a BSS and the BSS color is 1. AP2 and STA3 (corresponding to the first station) constitute a BSS and the BSS color is 2. STA3 can sense a radio frame sent by AP1.

AP1 obtains a transmission opportunity and sends an HE MU PPDU (corresponding to the first radio frame), and the target receiving stations are STA1 and STA2. When AP1 sends the HE MU PPDU, AP1 indicates a transmission duration for the current packet in the L-SIG of the HE MU PPDU, and indicates, in the HE-SIG-A of the HE MU PPDU, a transmission opportunity duration, a symbol length and quantity of an HE LTF, a BSS color (equal to 1) and uplink and downlink instructions, and the number of symbols occupied by the HE-SIG-B.

STA3 calculates the transmission duration of the current HE MU PPDU according to a parameter in the L-SIG and maintains a timer in the physical layer. The end to which the timer points is a time when the current PPDU transmission ends. The value of the timer decreases with time. If STA3 determines that the HE MU PPDU belongs to an OBSS frame according to the HE SIG A of the HE MU PPDU, STA3 triggers the termination of the receiving in advance. STA3 determines the duration of the remaining PPDU based on the timer. STA3 compares the sum of the duration of the remaining PPDU and the transmission opportunity duration (indicated by the txop duration field in the HE SIG A) with the current NAV of STA3. If the sum is greater than the current NAV, the NAV is updated by using the sum; otherwise, the current NAV is maintained unchanged.

The process in the above embodiment is used in the transmission of the HE MU PPDU, but the process may be applied in the transmission of the HE SU PPDU, in the transmission of the HE extended range SU PPDU, and in the transmission of the HE trigger-based PPDU. In the embodiment described above, a sender is an AP and a receiver is an STA. Alternatively, the sender may be an STA and the receiver may be an AP.

From the description of the embodiments described above, it will be apparent to those skilled in the art that the method of any embodiment described above may be implemented by means of software plus a necessary general-purpose hardware platform, or may of course be implemented by hardware, but in many cases, the former is a preferred implementation mode. Based on this understanding, the technical solution provided by the present application substantially, or the part contributing to the existing art, may be embodied in the form of a software product. The software product is stored on a storage medium (such as a Read-Only Memory (ROM), a Random Access Memory (RAM), a magnetic disk, or an optical disk) and includes several instructions for enabling a terminal device (which may be a mobile phone, a computer, a server, or a network device) to execute the method according to each embodiment of the present application.

The embodiments of the present disclosure further provide a device for processing an NAS. The device is used for implementing the above-mentioned embodiments and optional examples. What has been described above will not be repeated below. The term "module" used below may be software, hardware or a combination thereof capable of implementing predetermined functions. The device in the embodiments described below is preferably implemented by software, but implementation by hardware or by a combination of software and hardware is also possible and conceived.

Figure 10:
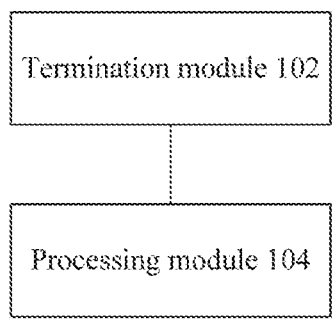
FIG. 10 is a block diagram of a device for processing an NAV according to an embodiment of the present disclosure.

FIG. 10 is a block diagram of a device for processing an NAV according to an embodiment of the present disclosure. As shown in FIG. 10, the device includes a termination module 102 and a processing module 104. The device is described below.

The termination module 102 is configured to terminate the receiving of a first radio frame when it is determined that a target receiving station of the first radio frame being received is not a first station. The processing module 104, connected to the termination module 102, is configured to update an NAV of the first station or maintained the NAV of the first station unchanged according to a remaining duration of the first radio frame and a first transmission opportunity duration carried in the first radio frame, where the remaining duration of the first radio frame is the transmission time used for transmitting the remaining part of the first radio frame after the receiving of the first radio frame is terminated.

In an optional embodiment, the processing module 104 may be configured to update the NAV of the first station or maintain the NAV of the first station unchanged according to the remaining duration of the first radio frame and the first transmission opportunity duration carried in the first radio frame in the following manner: determining the remaining duration of the first radio frame according to a preamble type of the first radio frame and the transmission time of the first radio frame; and updating the NAV of the first station or maintaining the NAV of the first station unchanged according to the determined remaining duration of the first radio frame and the first transmission opportunity duration carried in the first radio frame. Optionally, the first transmission opportunity duration may be determined according to a transmission opportunity duration field of an HE-SIG-A in the first radio frame.

In an optional embodiment, the processing module 104 may be configured to determine the remaining duration of the first radio frame according to the preamble type of the first radio frame and the transmission time of the first radio frame in the following manner: determining a receiving termination position of the first radio frame at a receiving termination time according to the preamble type of the first radio frame; and determining the remaining duration of the first radio frame according to the transmission time of the first radio frame and the determined receiving termination position of the first radio frame. In the present embodiment, the receiving termination positions of radio frames with different preamble types may be different. Therefore, when the remaining duration of the first radio frame is determined according to the preamble type of the first radio frame and the transmission time of the first radio frame, the receiving termination position of the first radio frame may be determined according to the preamble type of the first radio frame; after the receiving termination position of the first radio frame is determined, the remaining duration of the first radio frame may be determined according to the difference between the transmission time of the first radio frame and the determined receiving termination position.

In an optional embodiment, the processing module 104 may be configured to determine the receiving termination position according to the preamble type of the first radio frame in at least one of the manners described below.

In the case where the preamble type of the first radio frame is a Single-User format or Trigger based Uplink format, the time point when the HE-SIG-A in the first radio frame ends is determined to be the receiving termination position.

In the case where the preamble type of the first radio frame is an Extended Range Single-User format, the time point when the repeated HE-SIG-A in the first radio frame ends is determined to be the receiving termination position.

In the case where the preamble type of the first radio frame is a Multiple-User format, when it is determined that the target receiving station is not the first station according to the HE-SIG-A in the first radio frame, the time point when the HE-SIG-A in the first radio frame ends is determined to be the receiving termination position.

In the case where the preamble type of the first radio frame is a Multiple-User format, when it is determined that the target receiving station is not the first station according to the HE-SIG-B in the first radio frame, the time point when the HE-SIG-B in the first radio frame ends is determined to be the receiving termination position.

Therefore, the receiving termination position of the first radio frame may be determined according to the preamble type of the first radio frame.

In an optional embodiment, the modules described above may be located in the first station; the termination module 102 may be located in a first functional entity of the first station; the processing module 104 may be located in a second functional entity of the first station.

The embodiment of the present disclosure is described below using an example in which the modules described above are located in the first station.

The above-mentioned device further includes a sending module. The sending module may be located in the first functional entity of the first station and configured to send a receiving termination instruction to the second functional entity, where the receiving termination instruction is used for instructing the second functional entity to update the NAV of the first station or maintain the NAV of the first station unchanged. In the present embodiment, two functional entities may be disposed in the first station, that is, the first functional entity and the second functional entity. The two functional entities may perform different actions. The first functional entity may determine the destination station of the first radio frame and send a corresponding instruction to the second functional entity according to the determination result. The second functional entity may perform a corresponding action according to the instruction from the first functional entity, for example, the second functional entity may determine whether the NAV of the first station needs to be updated according to the receiving termination instruction from the first functional entity and perform corresponding processing according to the determination result. In the present embodiment, after the first functional entity receives the first radio frame and determines that the target receiving station of the first radio frame is not the first station, the order of the action of terminating the receiving of the first radio frame and the action of sending the receiving termination instruction to the second functional entity is not limited. The first functional entity and the second functional entity may be located in different layers of the first station. For example, the first functional entity may be located in a physical layer of the first station and perform functions implemented by the physical layer. The second functional entity may be located in an MAC layer of the first station and perform functions implemented by the MAC layer.

In an optional embodiment, the processing module 104 may be located in the second functional entity of the first station and configured to update the NAV of the first station or maintain the NAV of the first station unchanged according to the remaining duration of the first radio frame and the first transmission opportunity duration carried in the first radio frame in the following manner: updating the NAV of the first station or maintaining the NAV of the first station unchanged according to a predetermined value carried in the receiving termination instruction, where the predetermined value is the sum of the remaining duration of the first radio frame and the first transmission opportunity duration; or, updating the NAV of the first station or maintaining the NAV of the first station unchanged according to the remaining duration of the first radio frame and the first transmission opportunity duration carried in the receiving termination instruction. In the present embodiment, the receiving termination instruction is sent by the first functional entity to the second functional entity. Therefore, the sum of the remaining duration of the first radio frame and the first transmission opportunity duration may be carried in the first radio frame after being determined by the first functional entity; or, the first functional entity may directly use the receiving termination instruction to carry the remaining duration of the first radio frame and the first transmission opportunity duration.

In an optional embodiment, the processing module 104 may be configured to update the NAV of the first station or maintain the NAV of the first station unchanged according to the remaining duration of the first radio frame and the first transmission opportunity duration carried in the receiving termination instruction in the following manner: calculating the sum of the remaining duration of the first radio frame and the first transmission opportunity duration carried in the receiving termination instruction; and updating the NAV of the first station or maintaining the NAV of the first station unchanged according to the calculated sum. In the present embodiment, when the first radio frame carries the remaining duration of the first radio frame and the first transmission opportunity duration, the second functional entity may determine the sum itself and determine whether the NAV of the first station needs to be updated according to the determined sum of the remaining duration of the first radio frame and the first transmission opportunity duration.

The operations performed by the first functional entity and the second functional entity according to the above-mentioned embodiments are described below.

In an optional embodiment, the first functional entity may be used for performing at least one of the following operations: detecting a signal intensity, receiving and sending a radio frame on a wireless channel, providing a service for the second functional entity (including, but not limited to, sending the receiving termination instruction to the second functional entity), and the like. In another optional embodiment, the second functional entity may be used for performing at least one of the following operations: controlling the first functional entity to access a wireless channel, receiving and decoding a data unit sent by the first functional entity, sending a data unit to the first functional entity and requesting a service, detecting and controlling a virtual carrier, and the like.

In an optional embodiment, the processing module 104 may be configured to update the NAV of the first station or maintain the NAV of the first station unchanged according to the remaining duration of the first radio frame and the first transmission opportunity duration carried in the first radio frame in the following manner: determining whether the sum of the remaining duration of the first radio frame and the first transmission opportunity duration is greater than the NAV; in response to determining that the sum is greater than the NAV, updating the NAV according to the sum of the remaining duration of the first radio frame and the first transmission opportunity duration; in response to determining that the sum is not greater than the NAV, maintaining the NAV of the first station unchanged.

In practical application scenarios, one station (for example, the first station) may have a plurality of corresponding hidden stations. The first station may only receive a radio frame sent by one hidden station, and may receive radio frames sent by different hidden stations. The radio frames sent by different hidden stations may carry different transmission opportunity durations. In this case, the first station needs to update the NAV according to the radio frames sent by different hidden stations.

The operations performed by the processing module 104 will be described below in conjunction with the above two cases.

In an optional embodiment, the processing module 104 may be configured to update the NAV of the first station or maintain the NAV of the first station unchanged according to the remaining duration of the first radio frame and the first transmission opportunity duration carried in the first radio frame in the following manner: using a predetermined variable to store the first transmission opportunity duration and using the remaining duration of the first radio frame to update a radio frame duration timer (the radio frame duration timer may be configured in advance); when the value of the radio frame duration timer is zero, determining whether the predetermined variable is greater than the NAV; in response to determining that the predetermined variable is greater than the NAV, using the predetermined variable to update the NAV; in response to determining that the predetermined variable is less than or equal to the NAV, maintaining the NAV of the first station unchanged.

In another optional embodiment, before the value of the radio frame duration timer is zero, a second radio frame is received. When it is determined that a target receiving station of the second radio frame is not the first station, whether the sum of a remaining duration of the second radio frame and a second transmission opportunity duration carried in the second radio frame is greater than the sum of the predetermined variable and the value of the radio frame duration timer is determined. If the sum of the remaining duration of the second radio frame and the second transmission opportunity duration carried in the second radio frame is greater than the sum of the predetermined variable and the value of the radio frame duration timer, the predetermined variable is updated with the second transmission opportunity duration and the radio frame duration timer is updated with the remaining duration of the second radio frame. If the sum of the remaining duration of the second radio frame and the second transmission opportunity duration carried in the second radio frame is less than or equal to the sum of the predetermined variable and the radio frame duration timer, the NAV of the first station is maintained unchanged.

In an optional embodiment, the processing module 104 may be configured to update the NAV of the first station or maintain the NAV of the first station unchanged according to the remaining duration of the first radio frame and the first transmission opportunity duration carried in the first radio frame in the following manner: determining the remaining duration of the first radio frame according to the current transmission duration of the first radio frame indicated by a non-high throughput SIGNAL field of the first radio frame; and updating the NAV of the first station or maintaining the NAV of the first station unchanged according to the determined remaining duration of the first radio frame and the first transmission opportunity duration.

The various modules described above may be implemented by software or hardware. Implementation by hardware may, but may not necessarily, be performed by the following method: The various modules described above are located in a same processor or in multiple processors respectively.

Embodiments of the present disclosure further provide a computer-readable storage medium. Optionally, in the present embodiment, the computer-readable storage medium may be configured to store program codes for executing the steps described below.

In step S1, the receiving of a first radio frame is terminated when it is determined that a target receiving station of the first radio frame being received is not a first station.

In step S2, an NAV of the first station is updated or maintained unchanged according to a remaining duration of the first radio frame and a first transmission opportunity duration carried in the first radio frame, where the remaining duration of the first radio frame is the transmission time used for transmitting the remaining part of the first radio frame after the receiving of the first radio frame is terminated.

Optionally, in the present embodiment, the computer-readable storage medium may include, but not limited to, a U disk, an ROM, an RAM, a mobile hard disk, a magnetic disk, an optical disk or another medium capable of storing program codes.

Optionally, in the present embodiment, the processor executes the operations in the above method embodiments according to the program codes stored in the computer-readable storage medium.

Optionally, for examples in the present embodiment, reference may be made to the examples described in the above embodiments and optional implementation modes, and the examples will not be repeated in the present embodiment.

The method for updating the network allocation vector in the embodiments of the present disclosure can ensure consistent updates of network reservation time and the fairness of transmission and channel contention, and reduce collisions among stations.

Those skilled in the art should know that the above-mentioned modules or steps of the present application may be implemented by a universal computing device, the modules or steps may be concentrated on a single computing device or distributed on a network formed by multiple computing devices, and alternatively, the modules or steps may be implemented by program codes executable by the computing devices, so that the modules or steps may be stored in a storage device for execution by the computing devices, and in some circumstances, the illustrated or described steps may be executed in sequences different from those described herein, or they may be made into single integrated circuit modules separately, or multiple modules or steps therein may be made into a single integrated circuit module for implementation. In this way, the present application is not limited to any specific combination of hardware and software.

The above are only exemplary embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

With the method and device for processing the network allocation vector provided in the embodiments of the present disclosure, the problem of collisions with hidden stations caused by an inaccurate NAV update in the related art is solved, thereby ensuring the accuracy of the NAV update and the fairness of transmission and channel contention, and reducing collisions among hidden stations.

What is claimed is:

1. A method for processing a network allocation vector (NAV), comprising:
   terminating receiving of a first radio frame in response to determining that a target receiving station of the first radio frame being received is not a first station, wherein the terminating occurs at a time instant before an end time of the first radio frame;
   updating an NAV of the first station or maintaining the NAV of the first station unchanged according to a remaining duration of the first radio frame and a first transmission opportunity duration carried in the first radio frame, wherein the remaining duration of the first radio frame is transmission time used for transmitting a remaining part of the first radio frame after the receiving of the first radio frame is terminated, wherein the updating occurs at a time instant corresponding to the end time of the first radio frame and comprises using a predetermined variable to store the first transmission opportunity duration and using the remaining duration of the first radio frame to update a radio frame duration timer;
   before the value of the radio frame duration timer is zero, if a second radio frame is received, performing the steps of:
      in response to determining that that a target receiving station of the second radio frame is not the first station, terminating receiving of the second radio frame and determining whether a sum of a remaining duration of the second radio frame and a second transmission opportunity duration carried in the second radio frame is greater than a sum of the predetermined variable and the value of the radio frame duration timer;
      in response to determining that the sum of the remaining duration of the second radio frame and the second transmission opportunity duration carried in the second radio frame is greater than the sum of the predetermined variable and the value of the radio frame duration timer, using the second transmission opportunity duration to update the predetermined variable and using the remaining duration of the second radio frame to update the radio frame duration timer; and
      in response to determining that the sum of the remaining duration of the second radio frame and the second transmission opportunity duration carried in the second radio frame is less than or equal to the sum of the predetermined variable and the value of the radio frame duration timer, maintaining the NAV of the first station unchanged,
   wherein the method is performed by at least one processor.

2. The method according to claim 1, wherein the updating the NAV of the first station or maintaining the NAV of the first station unchanged according to the remaining duration of the first radio frame and the first transmission opportunity duration carried in the first radio frame comprises:
   determining the remaining duration of the first radio frame according to a preamble type of the first radio frame and transmission time of the first radio frame; and
   updating the NAV of the first station or maintaining the NAV of the first station unchanged according to the determined remaining duration of the first radio frame and the first transmission opportunity duration.

3. The method according to claim 2, wherein the determining the remaining duration of the first radio frame according to the preamble type of the first radio frame and the transmission time of the first radio frame comprises:
   determining a receiving termination position of the first radio frame at a receiving termination time according to the preamble type of the first radio frame; and
   determining the remaining duration of the first radio frame according to the transmission time of the first radio frame and the determined receiving termination position of the first radio frame.

4. The method according to claim 3, wherein the determining the receiving termination position of the first radio frame at the receiving termination time according to the preamble type of the first radio frame comprises at least one of the following:
   in response to determining that the preamble type of the first radio frame is a
   Single-User format or Trigger based Uplink format, determining that a time point when a High Efficiency SIGNAL field A (HE-SIG-A) in the first radio frame ends is the receiving termination position;
   in response to determining that the preamble type of the first radio frame is an Extended Range Single-User format, determining that a time point when a repeated HE-SIG-A in the first radio frame ends is the receiving termination position;
   in response to determining that the preamble type of the first radio frame is a Multiple-User format, and determining that the target receiving station is not the first station according to the HE-SIG-A in the first radio frame, determining that the time point when the HE-SIG-A in the first radio frame ends is the receiving termination position; or
   in response to determining that the preamble type of the first radio frame is the Multiple-User format, and determining that the target receiving station is not the first station according to a High Efficiency SIGNAL field B (HE-SIG-B) in the first radio frame, determining that a time point when the HE-SIG-Bin the first radio frame ends is the receiving termination position.

5. The method according to claim 1, before or after the terminating the receiving of the first radio frame in response to determining that that the target receiving station of the first radio frame being received is not the first station, the method further comprising:
   operating a first functional entity of the first station to send a receiving termination instruction to a second functional entity of the first station, wherein the receiving termination instruction is used for instructing the second functional entity to update the NAV of the first station or maintain the NAV of the first station unchanged.

6. The method according to claim 5, wherein the updating the NAV of the first station or maintaining the NAV of the first station unchanged according to the remaining duration of the first radio frame and the first transmission opportunity duration carried in the first radio frame comprises:
   operating the second functional entity to update the NAV of the first station or maintain the NAV of the first station unchanged according to the remaining duration of the first radio frame and the first transmission opportunity duration carried in the receiving termination instruction.

7. The method according to claim 6, wherein the operating the second functional entity to update the NAV of the first station or maintain the NAV of the first station unchanged according to the remaining duration of the first radio frame and the first transmission opportunity duration carried in the receiving termination instruction comprises:
   operating the second functional entity to calculate the sum of the remaining duration of the first radio frame and the first transmission opportunity duration carried in the receiving termination instruction; and
   operating the second functional entity to update the NAV of the first station or maintain the NAV of the first station unchanged according to the calculated sum.

8. The method according to claim 6, wherein the updating the NAV of the first station or maintaining the NAV of the first station unchanged according to the remaining duration of the first radio frame and the first transmission opportunity duration carried in the first radio frame comprises:
   determining whether a sum of the remaining duration of the first radio frame and the first transmission opportunity duration is greater than the NAV;
   in response to determining that the sum is greater than the NAV, updating the NAV of the first station by using the sum of the remaining duration of the first radio frame and the first transmission opportunity duration; and
   in response to determining that the sum is not greater than the NAV, maintaining the NAV of the first station unchanged.

9. The method according to claim 6, wherein the updating the NAV of the first station or maintaining the NAV of the first station unchanged according to the remaining duration of the first radio frame and the first transmission opportunity duration carried in the first radio frame comprises:
   using a predetermined variable to store the first transmission opportunity duration and using the remaining duration of the first radio frame to update a radio frame duration timer; and
   in response to determining that a value of the radio frame duration timer is zero, determining whether the predetermined variable is greater than a value of the NAV; in response to determining that the predetermined variable is greater than the value of the NAV, using the predetermined variable to update the NAV; in response to determining that the predetermined variable is less than or equal to the NAV, maintaining the NAV of the first station unchanged.

10. The method according to claim 5, wherein
   the first functional entity is used for performing at least one of the following operations: detecting a signal intensity, receiving and sending a radio frame on a wireless channel, or providing a service for the second functional entity; and/or
   the second functional entity is used for performing at least one of the following operations: controlling the first functional entity to access a wireless channel, receiving and decoding a data unit sent by the first functional entity, sending a data unit to the first functional entity and requesting a service, or detecting and controlling a virtual carrier.

11. The method according to claim 5, wherein the updating the NAV of the first station or maintaining the NAV of the first station unchanged according to the remaining duration of the first radio frame and the first transmission opportunity duration carried in the first radio frame comprises:
   operating the second functional entity to update the NAV of the first station or maintain the NAV of the first station unchanged according to a predetermined value carried in the receiving termination instruction, wherein the predetermined value is a sum of the remaining duration of the first radio frame and the first transmission opportunity duration.

12. The method according to claim 1, wherein the updating the NAV of the first station or maintaining the NAV of the first station unchanged according to the remaining duration of the first radio frame and the first transmission opportunity duration carried in the first radio frame comprises:
   determining whether a sum of the remaining duration of the first radio frame and the first transmission opportunity duration is greater than the NAV;
   in response to determining that the sum is greater than the NAV, updating the NAV of the first station by using the sum of the remaining duration of the first radio frame and the first transmission opportunity duration; and
   in response to determining that the sum is not greater than the NAV, maintaining the NAV of the first station unchanged.

13. The method according to claim 1, wherein the updating the NAV of the first station or maintaining the NAV of the first station unchanged according to the remaining duration of the first radio frame and the first transmission opportunity duration carried in the first radio frame comprises:
   in response to determining that the predetermined variable is less than or equal to the NAV, maintaining the NAV of the first station unchanged.

14. The method according to claim 1, wherein the updating the NAV of the first station or maintaining the NAV of the first station unchanged according to the remaining duration of the first radio frame and the first transmission opportunity duration carried in the first radio frame comprises:
   determining the remaining duration of the first radio frame according to a current transmission duration of the first radio frame indicated by a non-high throughput signal field of the first radio frame; and
   updating the NAV of the first station or maintaining the NAV of the first station unchanged according to the determined remaining duration of the first radio frame and the first transmission opportunity duration.

15. The method according to claim 1, wherein the first radio frame includes a BSS color information that is used for determining that the target receiving station of the first radio frame being received is not the first station.

16. The method according to claim 1, wherein updating the NAV of the first station further comprises:
   in response to determining that a value of the radio frame duration timer is zero, comparing the predetermined variable and a value of the NAV to determine whether the predetermined variable is greater than the value of the NAV; and
   in response to determining that the predetermined variable is greater than the value of the NAV, using the predetermined variable to update the NAV of the first station, wherein the updating occurs at a time instant corresponding to the expected end time of the first radio frame.

17. A non-transitory computer-readable storage medium storing executable instructions that, when executed by an electronic device, cause the electronic device to:
   terminate receiving of a first radio frame in response to determining that a target receiving station of the first radio frame being received is not a first station, wherein the terminating occurs at a time instant before an end time of the first radio frame;

update an NAV of the first station or maintain the NAV of the first station unchanged according to a remaining duration of the first radio frame and a first transmission opportunity duration carried in the first radio frame, wherein the remaining duration of the first radio frame is transmission time used for transmitting a remaining part of the first radio frame after the receiving of the first radio frame is terminated, wherein the updating occurs at a time instant corresponding to the end time of the first radio frame and comprises using a predetermined variable to store the first transmission opportunity duration and using the remaining duration of the first radio frame to update a radio frame duration timer;

before the value of the radio frame duration timer is zero, if a second radio frame is received, perform the steps of:

in response to determining that that a target receiving station of the second radio frame is not the first station, terminate receiving of the second radio frame and determine whether a sum of a remaining duration of the second radio frame and a second transmission opportunity duration carried in the second radio frame is greater than a sum of the predetermined variable and the value of the radio frame duration timer;

in response to determining that the sum of the remaining duration of the second radio frame and the second transmission opportunity duration carried in the second radio frame is greater than the sum of the predetermined variable and the value of the radio frame duration timer, use the second transmission opportunity duration to update the predetermined variable and use the remaining duration of the second radio frame to update the radio frame duration timer; and in response to determining that the sum of the remaining duration of the second radio frame and the second transmission opportunity duration carried in the second radio frame is less than or equal to the sum of the predetermined variable and the value of the radio frame duration timer, maintain the NAV of the first station unchanged.

18. The non-transitory computer-readable storage medium according to claim 17, wherein before or after the step of terminating the receiving of the first radio frame in response to determining that the target receiving station of the first radio frame being received is not the first station, the executable instructions further cause the electronic device to:

operate a first functional entity of the first station to send a receiving termination instruction to a second functional entity of the first station, wherein the receiving termination instruction is used for instructing the second functional entity to update the NAV of the first station or maintain the NAV of the first station unchanged.

19. The non-transitory computer-readable storage medium according to claim 18, wherein when the electronic device updates the NAV of the first station or maintains the NAV of the first station unchanged according to the remaining duration of the first radio frame and the first transmission opportunity duration carried in the first radio frame, the executable instructions further cause the electronic device to:

operate the second functional entity to update the NAV of the first station or maintain the NAV of the first station unchanged according to the remaining duration of the first radio frame and the first transmission opportunity duration carried in the receiving termination instruction.

20. The non-transitory computer-readable storage medium according to claim 17, wherein the first radio frame includes a BSS color information that is used for determining that the target receiving station of the first radio frame being received is not the first station.

21. The non-transitory computer-readable storage medium according to claim 17, the executable instructions for updating the NAV of the first station further cause the electronic device to:

in response to determining that a value of the radio frame duration timer is zero, comparing the predetermined variable and a value of the NAV to determine whether the predetermined variable is greater than the value of the NAV; and in response to determining that the predetermined variable is greater than the value of the NAV, using the predetermined variable to update the NAV of the first station, wherein the updating occurs at a time instant corresponding to the expected end time of the first radio frame.

22. An electronic device, comprising: at least one processor; and a memory communicably connected with the at least one processor and configured to store instructions executable by the at least one processor, wherein execution of the instructions by the at least one processor causes the at least one processor to:

terminate receiving of a first radio frame in response to determining that a target receiving station of the first radio frame being received is not a first station, wherein the terminating occurs at a time instant before an end time of the first radio frame; and update an NAV of the first station or maintain the NAV of the first station unchanged according to a remaining duration of the first radio frame and a first transmission opportunity duration carried in the first radio frame, wherein the remaining duration of the first radio frame is transmission time used for transmitting a remaining part of the first radio frame after the receiving of the first radio frame is terminated, wherein the updating occurs at a time instant corresponding to the end time of the first radio frame and comprises using a predetermined variable to store the first transmission opportunity duration and using the remaining duration of the first radio frame to update a radio frame duration timer;

before the value of the radio frame duration timer is zero, if a second radio frame is received, perform the steps of:

in response to determining that that a target receiving station of the second radio frame is not the first station, terminate receiving of the second radio frame and determine whether a sum of a remaining duration of the second radio frame and a second transmission opportunity duration carried in the second radio frame is greater than a sum of the predetermined variable and the value of the radio frame duration timer;

in response to determining that the sum of the remaining duration of the second radio frame and the second transmission opportunity duration carried in the second radio frame is greater than the sum of the predetermined variable and the value of the radio frame duration timer, use the second transmission opportunity duration to update the predetermined variable and use the remaining duration of the second radio frame to update the radio frame duration timer; and in response to determining that the sum of the remaining duration of the second radio frame and the second transmission opportunity duration carried in the second radio frame is less than or equal to the sum of the predetermined variable and the value of the radio frame duration timer, maintain the NAV of the first station unchanged.

23. The electronic device according to claim 22, wherein the execution of the instructions by the at least one processor further causes the at least one processor to:

in response to determining that the sum of the remaining duration of the second radio frame and the second transmission opportunity duration carried in the second radio frame is less than or equal to the sum of the predetermined variable and the value of the radio frame duration timer, maintain the NAV of the first station unchanged.

24. The electronic device according to claim 22, wherein the execution of the instructions for updating the NAV of the first station by the at least one processor further causes the at least one processor to:

in response to determining that a value of the radio frame duration timer is zero, comparing the predetermined variable and a value of the NAV to determine whether the predetermined variable is greater than the value of the NAV; and in response to determining that the predetermined variable is greater than the value of the NAV, using the predetermined variable to update the NAV of the first station, wherein the updating occurs at a time instant corresponding to the expected end time of the first radio frame.

* * * * *